(12) United States Patent
Chen

(10) Patent No.: US 11,442,949 B2
(45) Date of Patent: Sep. 13, 2022

(54) SEMANTIC SEARCH OF APPLICATION RULES

(71) Applicant: SAP SE, Walldorf (DE)

(72) Inventor: Wei Chen, Shanghai (CN)

(73) Assignee: SAP SE, Walldorf (DE)

( * ) Notice: Subject to any disclaimer, the term of this patent is extended or adjusted under 35 U.S.C. 154(b) by 430 days.

(21) Appl. No.: 16/571,561

(22) Filed: Sep. 16, 2019

(65) Prior Publication Data

US 2021/0081413 A1 Mar. 18, 2021

(51) Int. Cl.
*G06F 16/2455* (2019.01)
*G06F 16/2458* (2019.01)
*G06F 16/22* (2019.01)
*G06F 16/248* (2019.01)

(52) U.S. Cl.
CPC ...... *G06F 16/2462* (2019.01); *G06F 16/2246* (2019.01); *G06F 16/248* (2019.01); *G06F 16/24557* (2019.01); *G06F 16/24561* (2019.01); *G06F 16/24565* (2019.01)

(58) Field of Classification Search
CPC .......... G06F 16/2462; G06F 16/24557; G06F 16/2246; G06F 16/24561; G06F 16/24565; G06F 16/248
See application file for complete search history.

(56) References Cited

U.S. PATENT DOCUMENTS

| | | | | |
|---|---|---|---|---|
| 6,691,168 B1* | 2/2004 | Bal | ........................ | H04L 49/205 |
| | | | | 709/238 |
| 8,798,057 B1* | 8/2014 | Goel | ..................... | H04L 45/302 |
| | | | | 370/392 |
| 2010/0080224 A1* | 4/2010 | Panwar | ................... | H04L 69/22 |
| | | | | 370/392 |
| 2019/0205331 A1* | 7/2019 | Cevahir | ................ | G06F 16/538 |

* cited by examiner

*Primary Examiner* — Kris E Mackes
(74) *Attorney, Agent, or Firm* — Schwegman Lundberg & Woessner, P.A.

(57) ABSTRACT

Various examples are directed to systems and methods for searching application rules. A rule management system may access application rule data describing a first application rule and generate a first textual summary of the first application rule. The rule management system may encode the first textual summary to generate a first rule vector. The rule management system may receive a application rule query. The application rule query may include a query description. The rule management system may encode the query description to generate a first query vector and select the first application rule as responsive to the application rule query using the first rule vector and the first query vector. The rule management system may return the first application rule in response to the application rule query.

20 Claims, 9 Drawing Sheets

SEMANTIC SEARCH OF APPLICATION RULES

TECHNICAL FIELD

This document generally relates to methods and systems for use with computing systems. More particularly, this document relates to ways of configuring and operating computing devices to improve application and administration of rules including application rules.

BACKGROUND

Application rules are used in many different types of applications executed at computing systems. Applicant rules, sometimes also referred to as business rules, define relationships between data objects in applications. For example, in a human resources management (HRM) application, a computing system may execute application rules that implement changes to employees' employment status and/or terms based on certain conditions. Also, for example, a customer relationship management (CRM) application may apply application rules to determine when or how to update customer records, send reminders to sales people or customers, or perform other tasks.

BRIEF DESCRIPTION OF DRAWINGS

The present disclosure is illustrated by way of example and not limitation in the following figures.

DETAILED DESCRIPTION

Figure 1:
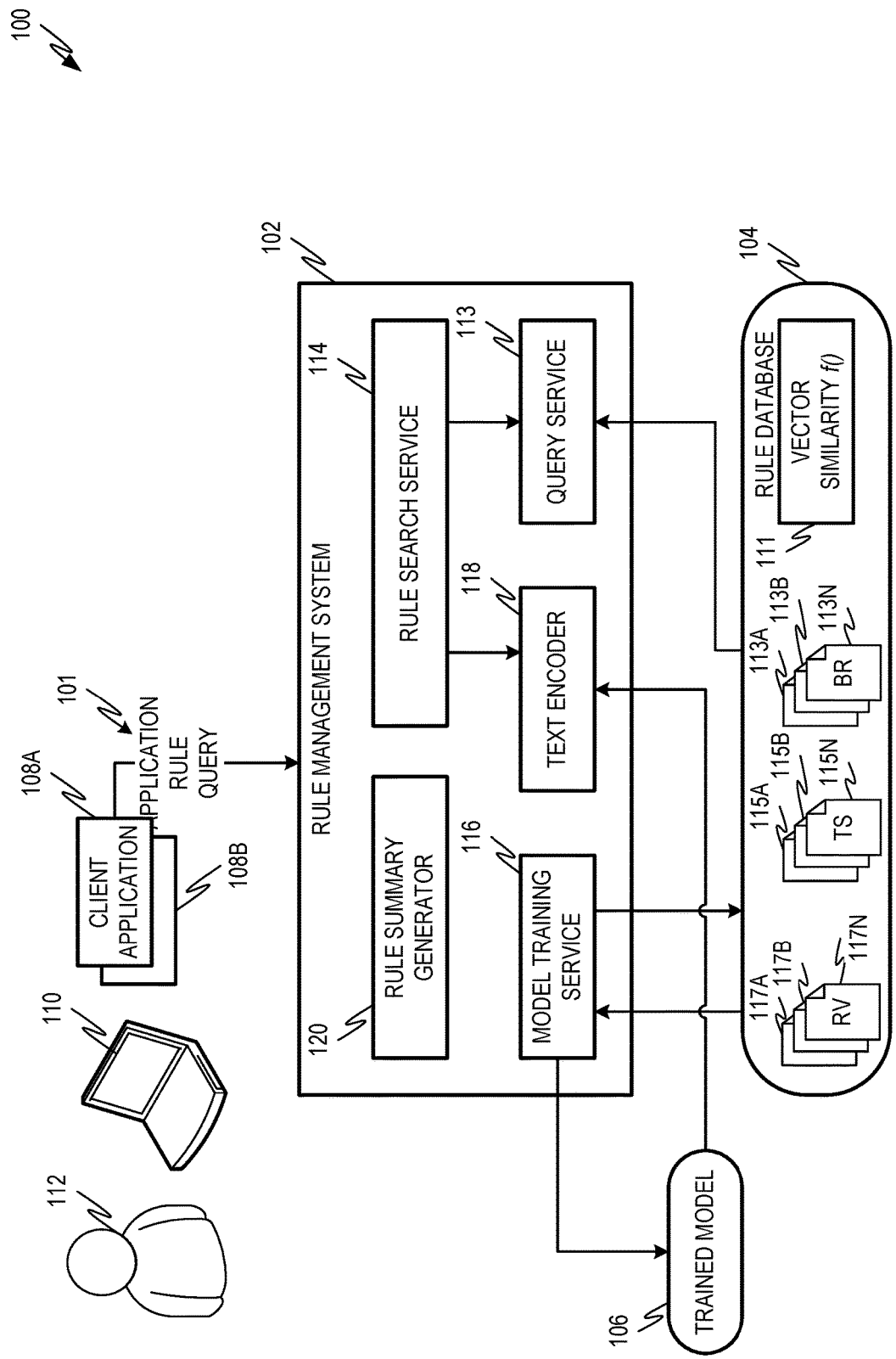
FIG. 1 is a diagram showing one example of an environment for implementing semantic searches of application rules.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Computing system applications that utilize application rules can present various technical challenges. For example, applications that utilize application rules are often managed by administrative users. To manage an application, an administrative user needs to know the status of application rules in an application. Consider an example HRM application in which an administrative user has need to introduce a rule that modifies the paygrade of employees having certain characteristics. The administrative user may first identify existing application rules governing paygrade of employees having the indicated characteristics and/or similar characteristics. For example, any existing rules that are inconsistent with the proposed change may be removed or modified.

Accordingly, when a computing system executes an application using application rules, effective and efficient execution of the application often involves providing an interface and supporting processing that allows users (e.g., administrative users) to identify application rules that are known by the application including, for example, application rules that are in effect, application rules that were in effect previously, application rules scheduled to go into effect, and so on.

Providing such an interface, however, can present significant technical challenges. Application rules are typically written, stored, and executed in computer-readable syntaxes as source code and/or object code. Computer-readable syntaxes, however, are not easily searchable in response to user-generated queries. Further, even if a desired application rule can be identified, computer-readable syntaxes may not be easily understandable, especially by administrative users who are not technical experts. This limits the operation of the computing system, for example, by limiting the effectiveness of application rule searches and making the applications difficult to use by users who are not technical experts.

Some examples attempt to remedy these and other difficulties by requiring that the author of a application rule provide an accompanying textual summary that can be used for later searching. This attempted remediation, however, introduces its own difficulties. A first is compliance. It requires a great deal of administrative effort to enforce policies that require rule generators to generate textual summaries. Further, manually-generated summaries themselves often suffer from defects, such as a lack of optimization for searching including inaccurate or incomplete descriptions of the rule.

These and other difficulties are addressed by providing a user interface between a user and computing system that implements a semantic search of application rules. Machine-generated textual summaries are produced for application rules in a set of application rules. The textual summaries are encoded to generate rule vectors for the respective rules. A user provides a application rule query that includes a textual query description. The query description is also encoded to generate a query vector. The query vector is compared to the rule vectors to identify application rules that are responsive to the application rule query. The indicated application rule or rules can then be provided to the user, for example, including the machine-generated textual summaries and logical descriptions of the application rules.

FIG. 1 is a diagram showing one example of an environment 100 for implementing semantic searches of application rules. The environment 100 includes a rule management system 102 that executes a rule search service 114 to provide semantic application rule searches. The rule management system 102 is in communication with a application rule database 104 that includes various application rules 113A, 113B, 113N. The application rules 113A, 113B, 113N, in some examples, are utilized by one or more client applications 108A, 108B described in more detail below. The rule management system 102 includes one or more computing devices, such as servers, that can be at one geographic location and/or distributed over multiple geographic applications. In some examples, the rule management system 102 is implemented as a component of a database management system for the database 104, as described in more detail herein.

The application rule database 104 is organized according to a database schema. The database schema describes various tables at a database including the columns of the tables and the relationships between the tables. The client applications 108A, 108B may execute at a client computing device 110. The client computing device 110 may be or include any suitable computing device or combination of computing devices. For example, client computing device 110 may be or include any suitable type of server, laptop computer, desktop computer, tablet computer, mobile computer, etc. In this example, the application rule database 104 includes a vector comparison function 111. The vector comparison function 111, as described in more detail herein, is executed, for example, by a database management system of the rule database 104 to compare rule vectors and query vectors to identify one or more application rules 113A, 113B, 113N that are responsive to a application rule query 101.

The client applications 108A, 108B may be associated with one or more user accounts or users. In some examples, the user 112 is a human user. In FIG. 1, the example client applications 108A, 108B are operated by a human user 112. In some examples, the user 112 is non-human (e.g., a software or hardware component). For example, the client applications 108A, 108B may have a user account with the rule management system 102 that does not require human intervention to use. Accordingly, client applications 108A, 108B, in some examples, do not include the user 112 and/or operate independent of the user 112.

The rule management system 102 is configured to generate textual summaries 115A, 115B, 115N of the application rules 113A, 113B, 113N and to encode the textual summaries 115 to corresponding rule vectors 117A, 117B, 117N. Although FIG. 1 shows three application rules 113A, 113B, 113N with corresponding textual summaries 115A, 115B, 115N and rule vectors 117A, 117B, 117N, any suitable number of application rules may be stored at the application rule database 104 and considered by the rule management system 102.

Application rules 113A, 113B, 113N are expressed in a computer-readable syntax, such as, for example, XML Process Definition Language (XPDL) or another suitable syntax. A rule summary generator 120 generates the textual summaries 115A, 115B, 115N corresponding to the application rules 113A, 113B, 113N. The textual summaries 115 are generated from the logic of the application rules 113A, 113B, 113N and express a textual or human-readable description of what the rule does. Further details of how the rule summary generator 120 may generate the textual summaries 115A, 115B, 115N is provided herein, for example, with respect to FIGS. 4-6.

The rule management system 102 further includes a text encoder 118 that can be used to generate rule vectors 117A, 117B, 117N for the respective application rules 113A, 113B, 113N based on the generated textual summaries 115. The text encoder 118 can utilize a text encoding algorithm such as, for example, Sentence2Vec or another suitable algorithm to convert the various textual summaries 115A, 115B, 115N to rule vectors 117A, 117B, 117N. In some examples, a model training service 116 trains a machine learning model 106 to perform text-to-vector conversions. The model 106 may be utilized by the text encoder 118, for example, to generate rule vectors 117A, 117B, 117N and/or to convert textual query descriptions to vectors, as described herein.

Figure 2:
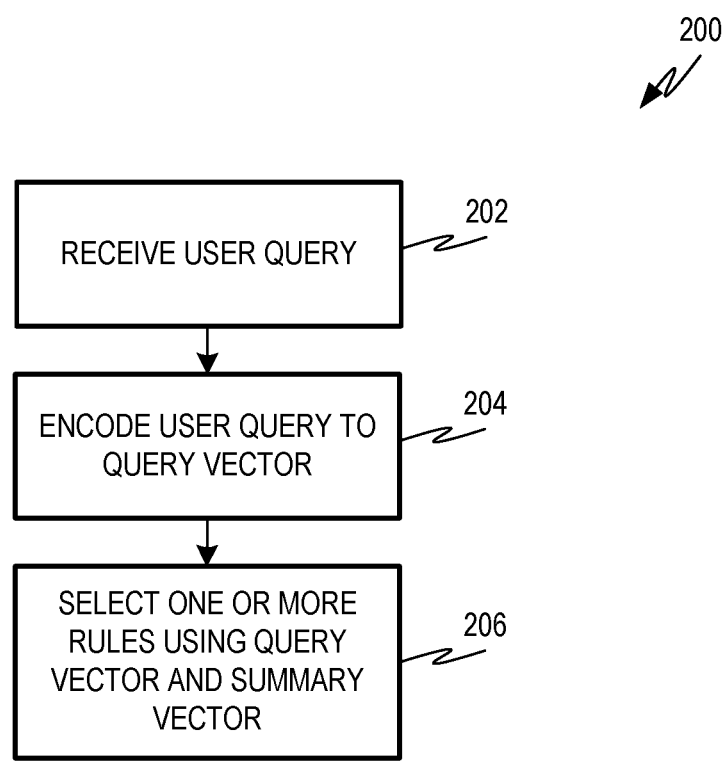
FIG. 2 is a flowchart showing one example of a process flow that can be executed by the rule management system to respond to a application rule query.

FIG. 2 is a flowchart showing one example of a process flow 200 that can be executed by the rule management system 102 to respond to a application rule query 101. The application rule query 101 may be made by the user 112, for example, utilizing the client computing device 110 and/or a client application 108A, 108B. The application rule query 101 includes a textual query description. The query description is, for example, expressed in natural language as provided by the user 112.

At operation 202, the rule management system 102 receives a user query including a query description. At operation 204, the rule management system 102 (e.g., the rule search service 114 thereof) provides the query description to the text encoder 118. The text encoder 118 generates a query vector, for example, utilizing the model 106. At operation 206, the rule management system 102 (e.g., the rule search service 114) selects one or more application rules 113A, 113B, 113N that are responsive to the application rule query 101 using the query vector and the rule vectors 117A, 117B, 117N corresponding to the application rules 113A, 113B, 113N. For example, a query service 113 may query the application rule database 104 with the query vector. The application rule database 104 may execute a vector comparison function 111 to select one or more rule vectors 117A, 117B, 117N that are similar to the query vector. In some examples, this includes determining a cosine similarity between the query vector and one or more of the rule vectors 117A, 117B, 117N. The application rule or rules 113A, 113B, 113N corresponding to the identified rule vectors 117A, 117B, 117N are returned to the user 112 in response to the application rule query 101.

Figure 3:
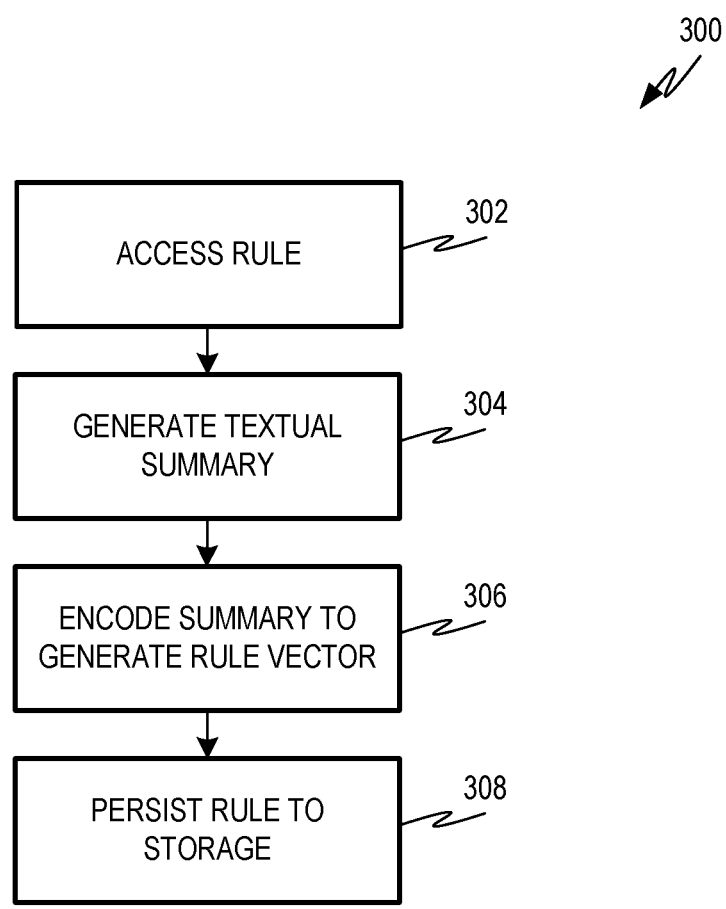
FIG. 3 is a diagram showing one example of a process flow that can be executed by the rule management system of FIG. 1 to generate a rule vector.

FIG. 3 is a diagram showing one example of a process flow 300 that can be executed by the rule management system 102 to generate a rule vector 117A for a application rule 113A. The process flow 300 describes the processing of a single application rule; however, it will be appreciated that the process flow 300 may be scaled in serial or in parallel to generate rule vectors 117A, 117B, 117N for more than one application rule 113A, 113B, 113N.

At operation 302, the rule summary generator 120 accesses a application rule 113A. The application rule 113A is expressed in a machine-readable syntax. At operation 304, the rule summary generator 120 generates a textual summary of the application rule. In some examples, the rule summary generator 120 generates the textual summary 115A at least in part by identifying conditions and actions in the application rule 113A. A condition is a state or predicate that, if true, indicates that one or more actions are to be taken. An action describes a thing that may be done to apply the rule. Consider the following example application rule:

If (last client contact>90 days):
    Then: initiate client contact

In this example, the application rule includes a condition, e.g., the last client contact was more than ninety days ago. If the condition is true, the rule calls for an action, e.g., initiating client contact.

In various examples, the rule summary generator 120 parses the application rule 113A to identify conditions and actions. The rule summary generator 120 may generate condition text for each condition and action text for each action. Condition and action texts may be generated by applying textual templates. For example, different types of conditions and different types of actions may use different templates. For each identified condition, the rule summary generator 120 selects a corresponding condition template and populates the condition textual template with condition variables for the condition extracted from the application rule 113 to generate condition text. Also, for each identified action, the rule summary generator 120 selects a corresponding action template and populates the action textual template with action variables for the action extracted from the application rule 113A to generate action text. The rule summary generator 120 may then merge corresponding condition and action texts, for example, utilizing a merger textual template. The result of the merger is a textual summary 115A.

At operation 306, the rule management system (e.g., utilizing the text encoder 118) encodes the textual summary 115A generated at operation 304 to generate a rule vector 117A. Generating the vector can involve utilizing the model 106. The textual summary 115A is provided as an input to the model 106. The model 106 provides as at least part of its output a rule vector 117A describing the textual summary 115A. Examples showing additional details of the operation of the text encoder 118 and the training of the model 106 are provided herein, for example, with respect to FIG. 7.

At operation 308, the rule management system 102 persists the application rule 113A, textual summary 115A, and/or rule vector 117A to the application rule database 104. In some examples, the application rule 113A, textual summary 115A for that application rule 113A, and rule vector 117A for that application rule 113A are persisted together as a application rule data structure. For example, in some examples, a application rule 113A is stored at a first column of a database table. The textual summary 115A and rule vector 117A for that application rule 113A may be stored at different columns of the same database table. In other examples, the application rule 113A, textual summary 115A and/or rule vector 117A are stored at different tables that may be linked, for example, by one or more foreign keys.

Figure 4:
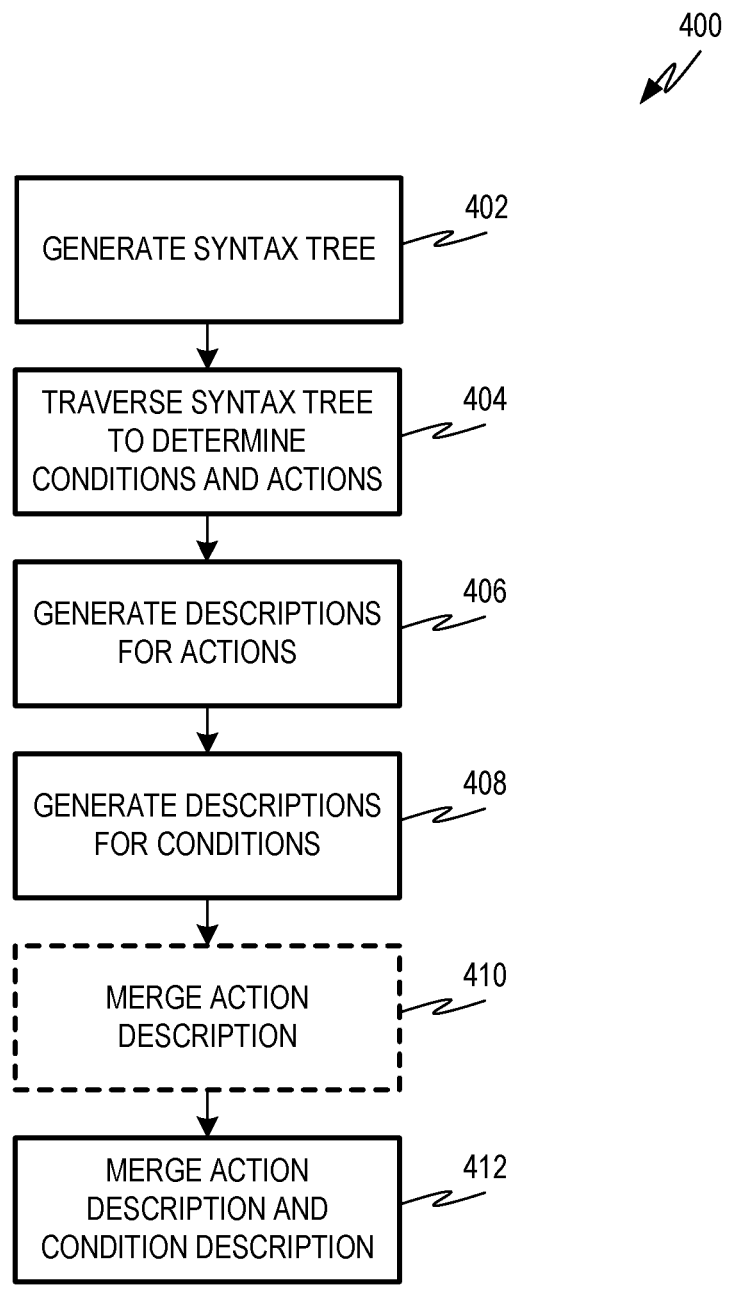
FIG. 4 is a flowchart showing one example of a process flow that can be executed to generate a textual summary of a application rule.

FIG. 4 is a flowchart showing one example of a process flow 400 that can be executed, for example, by the rule summary generator 120, to generate a textual summary of a application rule 113A. The process flow 400 shows one example way of performing the operation 304 from the process flow 300 described above. The process flow 400 illustrates generating a rule summary of a single application rule 113A. It will be appreciated, however, that the process flow 400 may be scaled in serial or in parallel to generate rule vectors 117A, 117B, 117N for more than one application rule 113A, 113B, 113N.

At operation 402, the rule summary generator 120 generates a syntax tree that represents the application rule 113A. The syntax tree can be, for example, an Abstract Syntax Tree (AST). The syntax tree represents the application rule as a set of connected nodes. Nodes of the syntax tree correspond to various actions, conditions, variables, literal values and other components of the application rule. Consider the example application rule first introduced above:

If (last client contact>90 days):
    Then: initiate client contact

In this example, the condition "If" may be represented by a first node. The operator ">" may be represented by a second node that depends from the "If" node. The variable "last client contact" is represented by a third node that depends from the ">" node and the literal value "90 days" is represented by a fourth node that also depends from the ">" node. The operator "then" is represented by a fifth node that depends from the "If" node and the action "initiate client contact" is represented by a sixth node that depends from the "then" node. An example AST for another example application rule is illustrated at FIG. 5 and described in more detail herein.

At operation 404, the rule summary generator 120 traverses the syntax tree to determine conditions and actions for the application rule 113. The precise form of the traversal may depend on the form of syntax tree utilized. Examples for traversing the AST shown in FIG. 5 are described in more detail below, for example, with respect to FIG. 6. The result of the traversal may be a set of conditions and corresponding actions extracted from the syntax tree.

Consider the following example application rule:
IF     jobInfo.level=='manager'     OR     jobInfo.employee=='first_manager_101'
    THEN assign_course (jobInfo.employee 'MBA_101') and set jobInfo.payment.bonusRate=0.15

Figure 5:
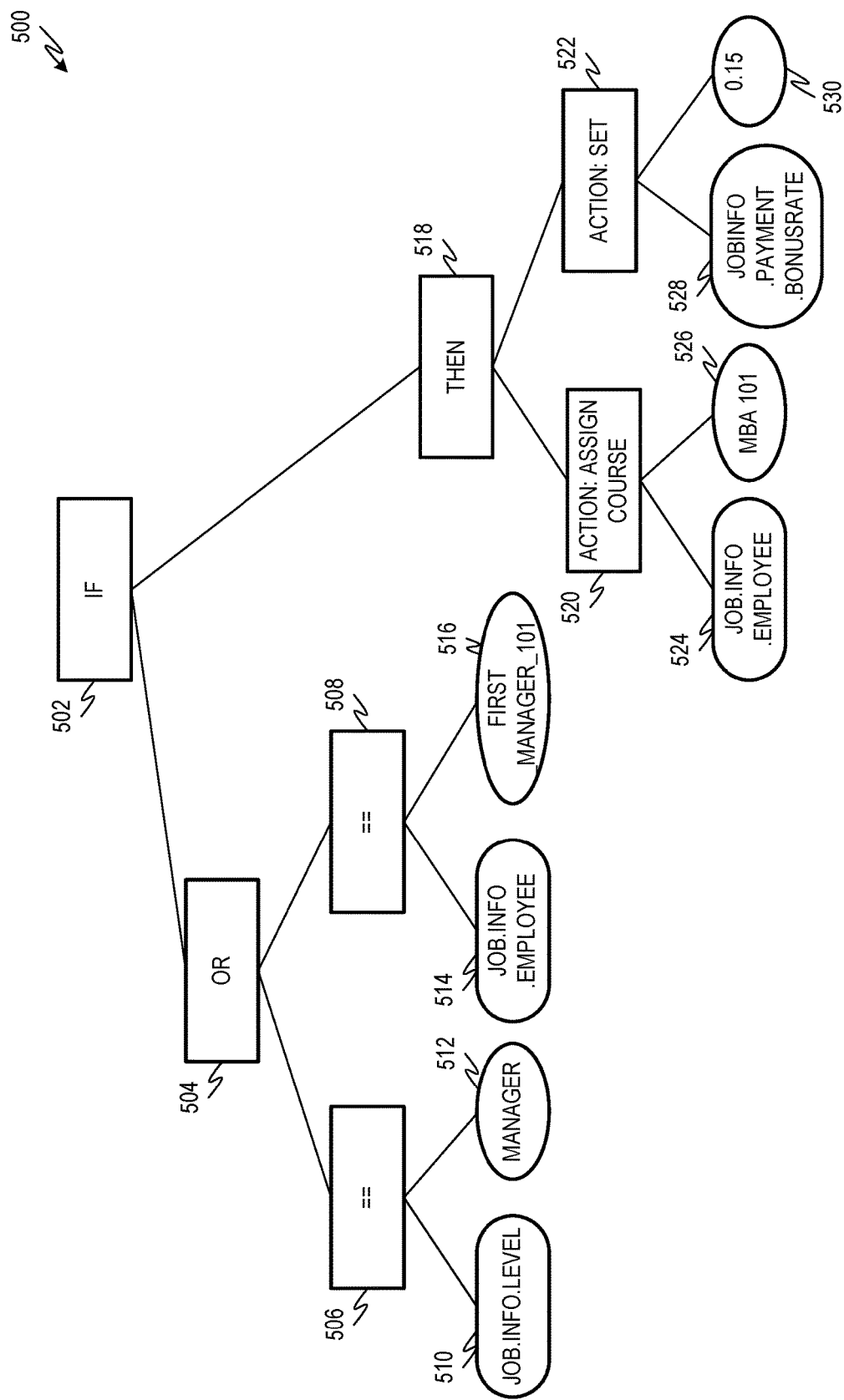
FIG. 5 is a diagram showing one example of an abstract syntax tree (AST) representing an example application rule.

FIG. 5 is a diagram showing one example of an AST 500 representing this example rule. Traversing the AST 500 may result in a listing of actions and conditions as shown by TABLE 1 below:

TABLE 1

| Action | Condition |
|---|---|
| assign_course(jobInfo.employee, 'MBA_101'); set jobInfo.payment.bonusRate = 0.15 | jobInfo.level == 'manager' jobInfo.employee == 'first_manager_101' |

Figure 6:
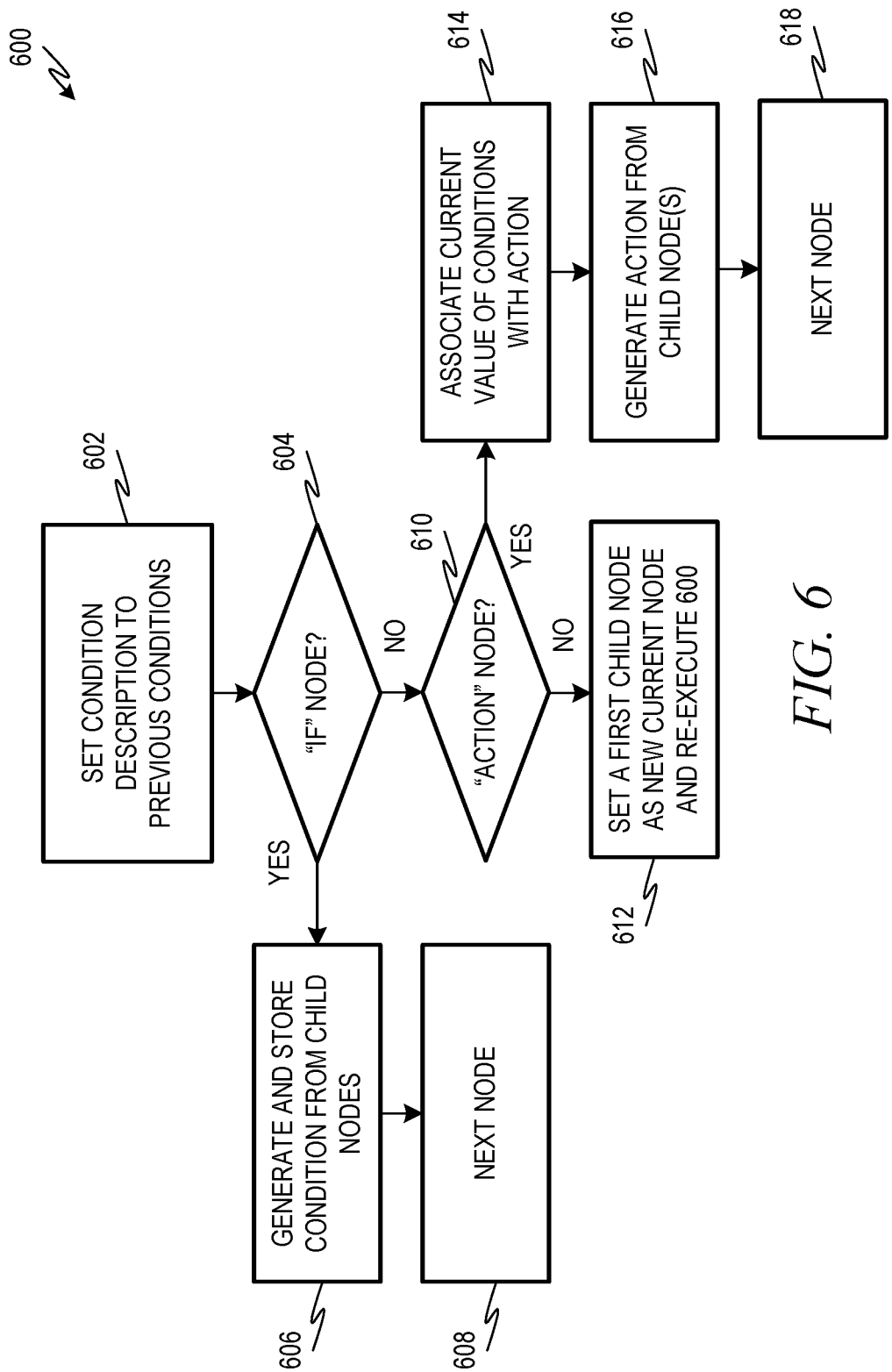
FIG. 6 is a flowchart showing one example of a process flow that can be executed by the rule summary generator to traverse a syntax tree to extract actions and conditions.

Examples showing how the AST 500 may be traversed to determine actions and conditions are provided herein, for example, with respect to FIG. 6.

At operation 406, the rule summary generator 120 generates descriptions for actions. The rule summary generator 120 may apply textual action templates to the actions determined at operation 404 to generate the textual summaries. An action template includes text with place holders where variables, objects, function calls, and/or literal values from the syntax tree may be filled to generate the textual summary of the action. Example action templates for the actions assign_course and set are given in TABLE 2 below:

TABLE 2

| Action | Example Action Templates |
|---|---|
| assign_course | Assign the course {1} to {0} Assign course to {0} Assign courses to user |
| Set | Change {0} to {1} Change {0} |

In the example of TABLE 2, {1} and {0} are place holders. The place holders refer to variables, objects, function calls, and/or literal values that can be added to the template to generate the textual summaries of the actions. A literal value is a portion of the application rule that can be expressed in language as it appears in the rule such as, for example, numbers, proper names, etc. An object refers to a data object that may be described by various attributes. For example, the name of a course may be a literal value. If the name of the course refers to a data object, then the course name may be an object (for example, indicating attributes of the course such as the instructor, class times, etc.). A function call may be used to look up or calculate, for example, a data object or literal value.

The rule summary generator may fill the action templates to generate textual summaries of the action. Filling the action template may include replacing place holders (if any) from the action template with variables, objects, function calls, and/or literal values from the syntax tree. In some examples, place holders in the action templates are numbered, as indicated in the examples of TABLE 2, with the numbers corresponding to the order of the variables and/or literal value nodes that depend from the action node at the syntax tree. In the example of TABLE 2 and FIG. 5, dependent nodes are ordered from left to right. For example, in the AST 500, the action node 520 corresponding to the action assign_course has two dependent nodes, a variable node 524 and an object node 526. The variable node 524 indicating job.info.employee corresponds to the placeholder {0}. The object node 526 indicating the object "MBA 101" is to the right of the variable node 524 and corresponds to {1}. The action node 522 corresponding to the action set also has two dependent nodes, a variable node 528 and a literal value node 530. The variable node 528 corresponds to the placeholder {0} and the literal value node 530 corresponds to the placeholder {1}.

In some examples, variables can be represented by a path, as shown in FIG. 5 and with several of the examples herein. For example, the variable jobinfo.payment.bonusrate is a path including three properties, "jobinfo" "payment" and bonusrate. When a variable represented by a path is filled to a place holder in an action template, various different techniques may be used. An example rule for filling a place holder with a path variable is given by TABLE 3 below:

| Number of properties in the path | Form |
|---|---|
| 2 | <child property label> of <parent property label>. |
| 3 | <3rd property label> of <2nd property label> of <1st property label> |
| 4+ | <the last property label> of < the 2nd property label in inverse order> of <the 1st property label>. |

According to the example rule, the variable jobinfo.employee would be expressed as Job Information of Employee. A three property path variable, such as jobinfo.payment.bonusrate would be expressed as The Yearly Bonus Rate of Payment of Job Information. A path variable with four or more properties, such as jobinfo.payment.bonusrate.escaltor would be expressed as Escalator of Payment of Job Information. In some examples, different properties of path variables are associated with property labels, which can be retrieved, for example, from the rules database 104 or another suitable source.

At operation 408, the rule summary generator 120 generates textual summaries for conditions. In some examples, the summary generator 120 produces a condition summary by traversing the syntax tree starting at the node corresponding to the condition. The summary generator 120 traverses the syntax tree to identify variables. The summary generator 120 may remove any duplicated variables and generate descriptions for the remaining variables. If more than one variable remains, the variables may be merged. TABLE 4 below shows examples of variables from a condition and corresponding example condition summaries:

TABLE 4

| Condition Variables | Condition Description |
|---|---|
| jobInfo.level | The Job profile's grade |
| jobInfo.level | The Job profile's level and |
| jobInfo.grade | The Job profile's grade |
| jobInfo.level | The Job profile's level and |
| jobInfo.grade | The Job profile's grade |
| jobInfo.level | The Job profile's level and |
| jobInfo.grade | The Job profile's grade |

At optional operation 410, the rule summary generator 120 merges textual summaries of actions. A merger of textual summaries of actions can take place, for example, if a application rule includes at least two equivalent actions. Equivalent actions are actions that are the same while, for example, having different properties. For example, actions that assign courses to users may be considered equivalent even if the actions describe a application rule including multiple actions that assign courses to users. These actions of the same type can be represented by a single combined textual summary for the action "assign courses to user."

At operation 412, the rule summary generator 120 merges textual summaries of actions with the textual summaries of corresponding conditions. For example, the rule summary generator 120 may concatenate a textual summary of an action or actions with textual summaries of one or more conditions corresponding to conditions for the action or actions. The rule summary generator 120 may insert one or more merge templates between the textual summary of the action or actions and/or the textual summary of the corresponding conditions or conditions. An example merge template for placement between textual summaries of actions and textual summaries of conditions is "according to." An example merge template for placement between textual summaries of actions or between textual summaries of conditions is "and."

FIG. 6 is a flowchart showing one example of a process flow 600 that can be executed by the rule summary generator 120 to traverse a syntax tree to extract actions and conditions. For example, the process flow 600 shows one way that the operations 406 and 408 can be executed. The process flow 600 is executed recursively with respect to various nodes of a syntax tree. The process flow 600 is executed with respect to a current node and with a condition variable. The condition variable tracks conditions and portions of conditions that have been extracted from the syntax tree. Initially, the condition variable is equal to null and the current node is the root node of the syntax tree (e.g., the "IF" node 502 of the example AST 500). The current node and condition variables carry over from recursive iteration to iteration of the process flow 600, as described.

At operation 602, the rule summary generator 120 sets the condition variable equal to previous conditions (if any). Initially, when the current node is the root node 502, there may be no previous conditions. At operation 604, the rule summary generator 120 determines if the current node is an "if" node. If the current node is an "if" node, the rule summary generator 120 proceeds to operation 606 where the child nodes of the current node are traversed and used to add to the condition variable. At operation 608, the rule summary generator 120 sets the current node to the next node and re-executes the process flow 600.

If the current node is not an "if" node at operation 604, the rule summary generator 120 determines, at operation 610, where the current node is an action node. If, at operation 610, the current node is not an action node, the rule summary generator 120, at operation 612, sets a first child of the current node as a new current node and re-executes the process flow 600.

If, at operation 610, the current node is an action node, the rule summary generator 120 associates the action indicated by the current node with the condition or conditions indicated by the conditions variable at operation 614. At operation 616, the rule summary generator 120 builds action parameters using the child nodes of the current node. If any nodes remain, the rule summary generator 120, at operation 618, sets the current node equal to the next node and re-executes the process flow 600.

Consider the example AST 500 with the process flow 600. The rule summary generator 120 may begin consideration of the AST 500 with the current node set to the root node 502. At operation 602, the rule summary generator 120 sets the condition variable equal to previous conditions. Because the node 502 is the first node considered, there may not be any previous conditions. At operation 604, the rule summary generator 120 determines that the node 502 is an "if" node. At operation 608, the rule summary generator 120 generates and stores a condition from the child nodes of the node 502 at operation 606. This may involve traversing the nodes 504, 506, 510, 512, 508, 514, and 516 to generate conditions as indicated by TABLE 5 below:

TABLE 5

| Action | Condition |
|---|---|
| | job.info.level == manager |
| | job.info.employee == first manager |

The rule summary generator 120, at operation 608, sets the next node 518 as the current node and re-executes the process flow 600. Because the new current node 518 is neither an "if" node (operation 604) nor an "action" node (operation 610), the rule summary generator 120 proceeds to operation 612 and sets a first child node (e.g., node 520) as the new current node and re-executes the process flow 600. Node 520 is an action node, so, at operation 616, the rule summary generator 120 associates the current value of the conditions variable, indicated by the conditions shown in TABLE 5, with the action indicated by node 520 (e.g., assign course). The rule summary generator 120 builds an action from the child nodes 524 of the current node 520, resulting in the state indicated by TABLE 6 below:

TABLE 6

| Action | Condition |
|---|---|
| assign_course (jobinfo.employee, 'MBA_101' | job.info.level == manager job.info.employee == first manager |

Because there is another node (e.g., node 522), the rule summary generator 120 sets the node 522 as the new current node and re-executes the process flow 600. Because the node 522 is also an action node, the rule summary generator 120 associates the current value of the conditions variable with the action of the current node 522 at operation 614. At operation 616, the rule summary generator 120 builds an action from the child nodes 528, 530 of the current node 522. This results in the action list and condition list indicated by TABLE 7 below:

TABLE 7

| Action | Condition |
|---|---|
| assign_course (jobinfo.employee, 'MBA_101' | job.info.level == manager job.info.employee == first manager |
| set jobinfo.payment.bonusrate = 0.15 | |

Figure 7:
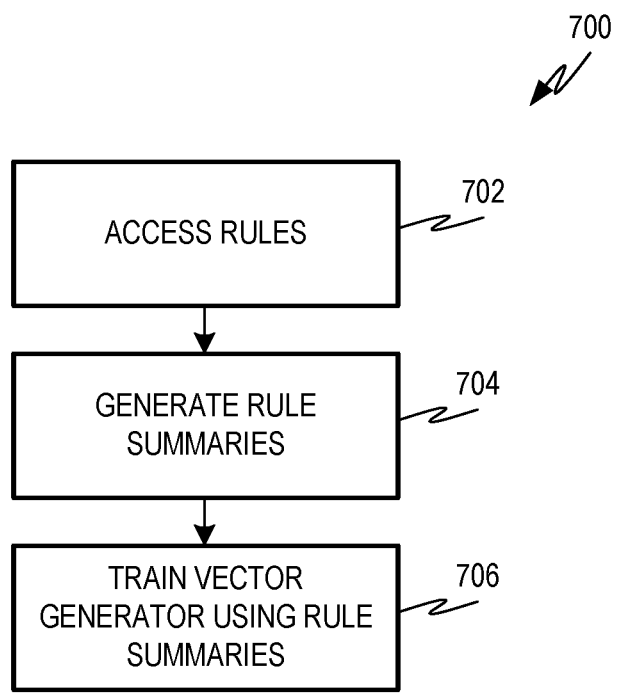
FIG. 7 is a flowchart showing one example of a process flow that may be executed by the rule management system of FIG. 1 to generate the trained model for encoding textual summaries of application rules to vectors.

FIG. 7 is a flowchart showing one example of a process flow 700 that may be executed by the rule management system 102 (e.g., the model training service 116 thereof) to generate the trained model 106 for encoding textual summaries of application rules to vectors. At operation 702, the model training service 116 accesses application rules 113A, 113B, 113N at the application rule database 104. At operation 704, the rule management system 102 generates textual rule summaries 115A, 115B, 115N, for example, as described herein utilizing the rule summary generator 120 as described herein. At operation 706, the model training service 116 trains the model 106 utilizing the textual summaries 115A, 115B, 115N as training data. In some examples, the model training service 116 is configured to implement a Sentence2Vec training technique to generate the model 106. The model 106 may be configured to receive a textual summary 115A, 115B, 115N and/or textual summary from the query 101 as an input and provide as output a vector that can be used, as described herein.

EXAMPLES

Example 1 is a system for searching application rules, the system comprising: a processor; and a non-transitory machine-readable medium having instructions stored thereon that, when executed by the processor, cause the processor to perform operations comprising: accessing application rule data describing a first application rule; generating a first textual summary of the first application rule; encoding the first textual summary to generate a first rule vector; receiving a application rule query, the application rule query including a query description; encoding the query description to generate a first query vector; selecting the first application rule as responsive to the application rule query using the first rule vector and the first query vector; and returning the first application rule in response to the application rule query.

In Example 2, the subject matter of Example 1 optionally includes wherein generating the first textual summary of the first application rule comprises: identifying at least one action indicated by the first application rule; identifying at least one condition indicated by the first application rule; applying an action template to a first action of the at least one action to generate a textual summary of the first action; and applying a condition template to a first condition of the at least one condition to generate a textual summary of the first condition.

In Example 3, the subject matter of Example 2 optionally includes wherein the first textual summary is based at least in part on the textual summary of the first action and the textual summary of the first condition.

In Example 4, the subject matter of any one or more of Examples 2-3 optionally includes wherein generating the first textual summary further comprises: applying an action template to a second action of the at least one action to generate a textual summary of the second action; determining that the first action and the second action are equivalent actions; and using the textual summary of the first action to generate a combined textual summary of the first action and the second action, wherein first textual summary is based at least in part on the combined textual summary.

In Example 5, the subject matter of any one or more of Examples 2-4 optionally includes wherein generating the first textual summary further comprises: generating a syntax tree representing the first application rule; and traversing the syntax tree to identify the at least one action indicated by the first application rule and the at least one condition indicated by the first application rule.

In Example 6, the subject matter of any one or more of Examples 2-5 optionally includes wherein generating the first textual summary further comprises applying a merge template using at least the textual summary of the first action and the textual summary of the first condition to generate the query description.

In Example 7, the subject matter of any one or more of Examples 1-6 optionally includes the operations further comprising: generating a first application rule data structure for the first application rule, the first application rule data structure comprising a computer-readable syntax of the first application rule, the query description, and the first rule vector; and storing the first application rule data structure at a application rule database.

In Example 8, the subject matter of Example 7 optionally includes the operations further comprising storing the first application rule data structure at the application rule database, wherein selecting the first application rule as responsive to the application rule query comprises prompting a database management system of the application rule database to execute a vector comparison function to compare the first rule vector and the first query vector.

In Example 9, the subject matter of any one or more of Examples 1-8 optionally includes wherein selecting the first application rule as responsive to the application rule query comprises determining a cosine similarity between the first rule vector and the first query vector.

Example 10 is a method of searching application rules, comprising: accessing, by a rule management system, application rule data describing a first application rule, the rule management system comprising at least one processor; generating, by the rule management system, a first textual summary of the first application rule; encoding the first textual summary, by the rule management system, to generate a first rule vector; receiving a application rule query, by the rule management system, the application rule query including a query description; encoding the query description, by the rule management system, to generate a first query vector; selecting, by the rule management system, the first application rule as responsive to the application rule query using the first rule vector and the first query vector; and returning, by the rule management system, the first application rule in response to the application rule query.

In Example 11, the subject matter of Example 10 optionally includes wherein generating the first textual summary of the first application rule comprises: identifying at least one action indicated by the first application rule; identifying at least one condition indicated by the first application rule; applying an action template to a first action of the at least one action to generate a textual summary of the first action; and applying a condition template to a first condition of the at least one condition to generate a textual summary of the first condition.

In Example 12, the subject matter of Example 11 optionally includes wherein the first textual summary is based at least in part on the textual summary of the first action and the textual summary of the first condition.

In Example 13, the subject matter of any one or more of Examples 11-12 optionally includes wherein generating the first textual summary further comprises: applying an action template to a second action of the at least one action to generate a textual summary of the second action; determining that the first action and the second action are equivalent actions; and using the textual summary of the first action to generate a combined textual summary of the first action and the second action, wherein first textual summary is based at least in part on the combined textual summary.

In Example 14, the subject matter of any one or more of Examples 11-13 optionally includes wherein generating the first textual summary further comprises: generating a syntax tree representing the first application rule; and traversing the syntax tree to identify the at least one action indicated by the first application rule and the at least one condition indicated by the first application rule.

In Example 15, the subject matter of any one or more of Examples 11-14 optionally includes wherein generating the first textual summary further comprises applying a merge template using at least the textual summary of the first action and the textual summary of the first condition to generate the query description.

In Example 16, the subject matter of any one or more of Examples 10-15 optionally includes generating a first application rule data structure for the first application rule, the first application rule data structure comprising a computer-readable syntax of the first application rule, the query description, and the first rule vector; and storing the first application rule data structure at a application rule database.

In Example 17, the subject matter of Example 16 optionally includes storing the first application rule data structure at the application rule database, wherein selecting the first application rule as responsive to the application rule query comprises prompting a database management system of the application rule database to execute a vector comparison function to compare the first rule vector and the first query vector.

In Example 18, the subject matter of any one or more of Examples 10-17 optionally includes wherein selecting the first application rule as responsive to the application rule query comprises determining a cosine similarity between the first rule vector and the first query vector.

Example 19 is a non-transitory machine-readable medium having instructions stored thereon that, when executed by at least one processor, cause the at least one processor to perform operations comprising: accessing application rule data describing a first application rule; generating a first textual summary of the first application rule; encoding the first textual summary to generate a first rule vector; receiving a application rule query, the application rule query including a query description; encoding the query description to generate a first query vector; selecting the first application rule as responsive to the application rule query using the first rule vector and the first query vector; and returning the first application rule in response to the application rule query.

In Example 20, the subject matter of Example 19 optionally includes wherein generating the first textual summary of the first application rule comprises: identifying at least one action indicated by the first application rule; identifying at least one condition indicated by the first application rule; applying an action template to a first action of the at least one action to generate a textual summary of the first action; and applying a condition template to a first condition of the at least one condition to generate a textual summary of the first condition.

Figure 8:
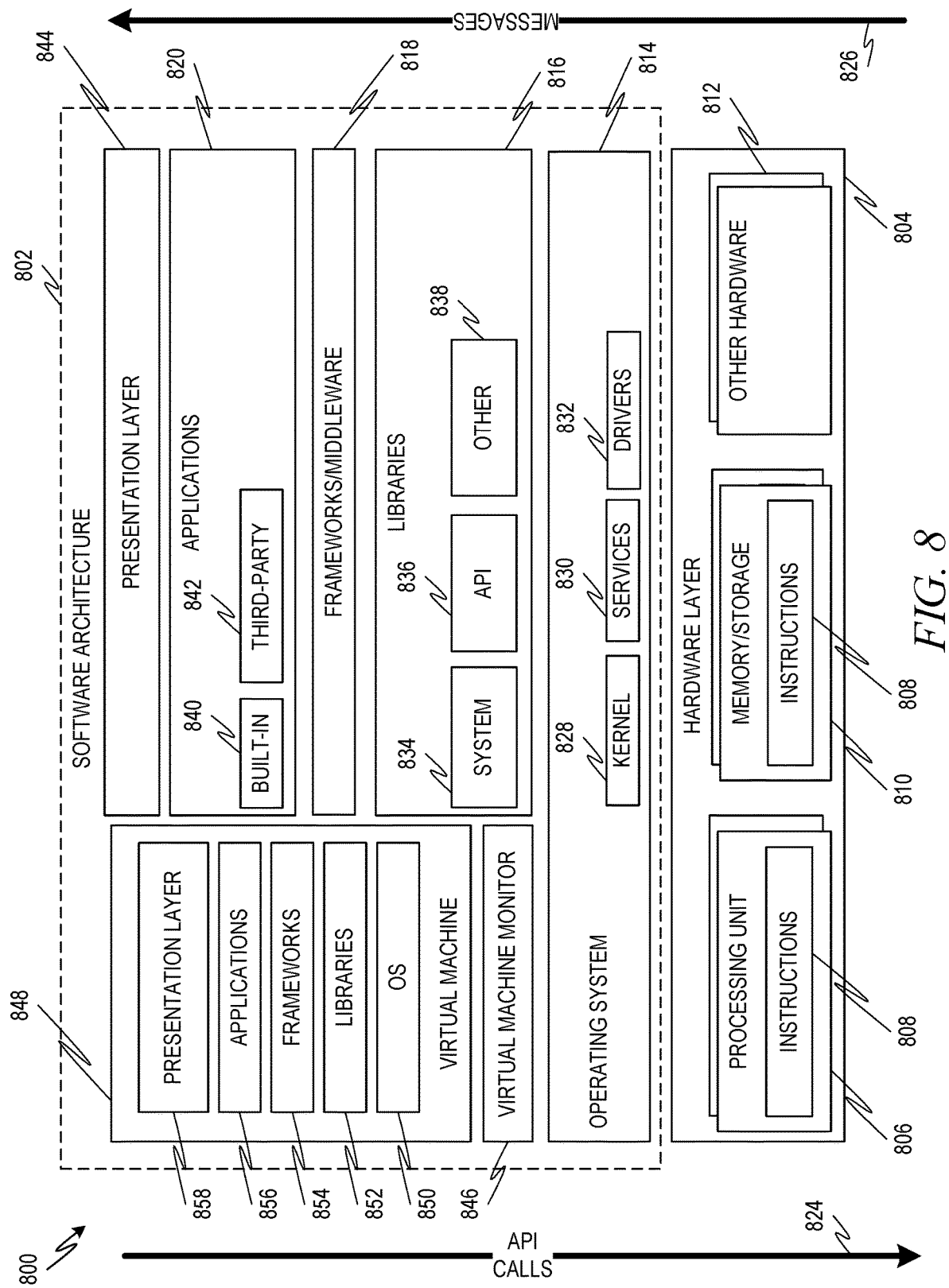
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 10D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 includes built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system 834, API libraries 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 9:
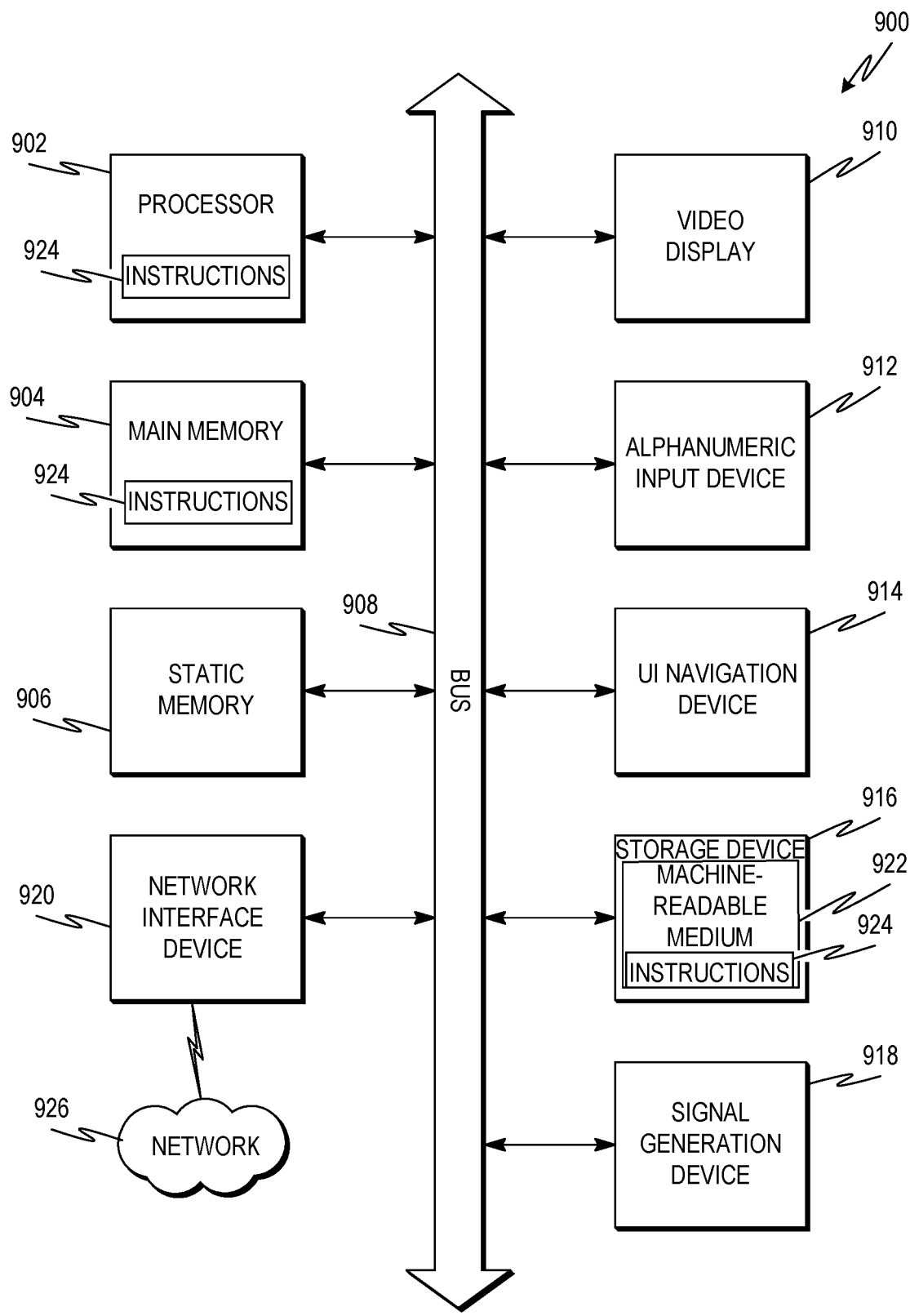
FIG. 9 is a block diagram of a machine in the example form of a computing system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for searching application rules, the system comprising:
   a processor; and
   a non-transitory machine-readable medium having instructions stored thereon that, when executed by the processor, cause the processor to perform operations comprising:
       accessing application rule data describing a first application rule;
       generating a textual summary of the first application rule;
       encoding the textual summary of the first application rule to generate a first rule vector;
       receiving an application rule query, the application rule query including a query description;
       encoding the query description to generate a first query vector;
       selecting the first application rule as responsive to the application rule query using the first rule vector and the first query vector; and
       returning the first application rule in response to the application rule query.

2. The system of claim 1, wherein generating the textual summary of the first application rule comprises:
   identifying at least one action indicated by the first application rule;
   identifying at least one condition indicated by the first application rule;
   applying an action template to a first action of the at least one action to generate a textual summary of the first action; and
   applying a condition template to a first condition of the at least one condition to generate a textual summary of the first condition.

3. The system of claim 2, wherein the textual summary of the first application rule is based at least in part on the textual summary of the first action and the textual summary of the first condition.

4. The system of claim 2, wherein generating the textual summary of the first application rule further comprises:
   applying an action template to a second action of the at least one action to generate a textual summary of the second action;
   determining that the first action and the second action are equivalent actions; and
   using the textual summary of the first action to generate a combined textual summary of the first action and the second action, wherein textual summary of the first application rule is based at least in part on the combined textual summary.

5. The system of claim 2, wherein generating the textual summary of the first application rule further comprises:
   generating a syntax tree representing the first application rule; and
   traversing the syntax tree to identify the at least one action indicated by the first application rule and the at least one condition indicated by the first application rule.

6. The system of claim 2, wherein generating the textual summary of the first application rule further comprises applying a merge template using at least the textual summary of the first action and the textual summary of the first condition to generate the query description.

7. The system of claim 1, the operations further comprising:
   generating a first application rule data structure for the first application rule, the first application rule data structure comprising a computer-readable syntax of the first application rule, the query description, and the first rule vector; and
   storing the first application rule data structure at an application rule database.

8. The system of claim 7, the operations further comprising storing the first application rule data structure at the application rule database, wherein selecting the first application rule as responsive to the application rule query comprises prompting a database management system of the application rule database to execute a vector comparison function to compare the first rule vector and the first query vector.

9. The system of claim 1, wherein selecting the first application rule as responsive to the application rule query comprises determining a cosine similarity between the first rule vector and the first query vector.

10. A method of searching application rules, comprising:
    accessing, by a rule management system, application rule data describing a first application rule, the rule management system comprising at least one processor;
    generating, by the rule management system, a textual summary of the first application rule;
    encoding the textual summary of the first application rule, by the rule management system, to generate a first rule vector;
    receiving an application rule query, by the rule management system, the application rule query including a query description;
    encoding the query description, by the rule management system, to generate a first query vector;
    selecting, by the rule management system, the first application rule as responsive to the application rule query using the first rule vector and the first query vector; and
    returning, by the rule management system, the first application rule in response to the application rule query.

11. The method of claim 10, wherein generating the textual summary of the first application rule comprises:
    identifying at least one action indicated by the first application rule;
    identifying at least one condition indicated by the first application rule;
    applying an action template to a first action of the at least one action to generate a textual summary of the first action; and
    applying a condition template to a first condition of the at least one condition to generate a textual summary of the first condition.

12. The method of claim 11, wherein the textual summary of the first application rule is based at least in part on the textual summary of the first action and the textual summary of the first condition.

13. The method of claim 11, wherein generating the textual summary of the first application rule further comprises:
applying an action template to a second action of the at least one action to generate a textual summary of the second action;
determining that the first action and the second action are equivalent actions; and
using the textual summary of the first action to generate a combined textual summary of the first action and the second action, wherein textual summary of the first application rule is based at least in part on the combined textual summary.

14. The method of claim 11, wherein generating the textual summary of the first application rule further comprises:
generating a syntax tree representing the first application rule; and
traversing the syntax tree to identify the at least one action indicated by the first application rule and the at least one condition indicated by the first application rule.

15. The method of claim 11, wherein generating the textual summary of the first application rule further comprises applying a merge template using at least the textual summary of the first action and the textual summary of the first condition to generate the query description.

16. The method of claim 10, further comprising:
generating a first application rule data structure for the first application rule, the first application rule data structure comprising a computer-readable syntax of the first application rule, the query description, and the first rule vector; and
storing the first application rule data structure at an application rule database.

17. The method of claim 16, further comprising storing the first application rule data structure at the application rule database, wherein selecting the first application rule as responsive to the application rule query comprises prompting a database management system of the application rule database to execute a vector comparison function to compare the first rule vector and the first query vector.

18. The method of claim 10, wherein selecting the first application rule as responsive to the application rule query comprises determining a cosine similarity between the first rule vector and the first query vector.

19. A non-transitory machine-readable medium having instructions stored thereon that, when executed by at least one processor, cause the at least one processor to perform operations comprising:
accessing application rule data describing a first application rule;
generating a textual summary of the first application rule;
encoding the textual summary of the first application rule to generate a first rule vector;
receiving an application rule query, the application rule query including a query description;
encoding the query description to generate a first query vector;
selecting the first application rule as responsive to the application rule query using the first rule vector and the first query vector; and
returning the first application rule in response to the application rule query.

20. The machine-readable medium of claim 19, wherein generating the textual summary of the first application rule comprises:
identifying at least one action indicated by the first application rule;
identifying at least one condition indicated by the first application rule;
applying an action template to a first action of the at least one action to generate a textual summary of the first action; and
applying a condition template to a first condition of the at least one condition to generate a textual summary of the first condition.

* * * * *